United States Patent [19]

Northup et al.

[11] 3,935,866
[45] Feb. 3, 1976

[54] GRAIN LOSS MONITOR

[75] Inventors: Edwin M. Northup, Milwaukee; David L. Moore, Brookfield, both of Wis.; J. Lyle Shaver, Blue Springs, Mo.

[73] Assignee: Allis-Chalmers Corporation, Milwaukee, Wis.

[22] Filed: Dec. 23, 1974

[21] Appl. No.: 536,030

[52] U.S. Cl. ............................. 130/24; 56/DIG. 15
[51] Int. Cl.$^2$ ..................................... A01F 12/00
[58] Field of Search ............... 130/24, 27 R, 30 R; 56/DIG. 15, 10.2

[56] References Cited
UNITED STATES PATENTS

| | | | |
|---|---|---|---|
| 3,515,144 | 6/1970 | Morrison | 56/DIG. 15 X |
| 3,563,013 | 2/1971 | Elfes | 56/DIG. 15 X |
| 3,574,307 | 4/1971 | Theobald | 130/24 |
| 3,610,252 | 10/1971 | De Coene | 130/24 |

*Primary Examiner*—Hugh R. Chamblee
*Attorney, Agent, or Firm*—Lee H. Kaiser

[57] ABSTRACT

A grain loss monitor for a combine harvester derives a grain loss rate signal in accordance with the number of grains impinging on a transducer and a ground speed signal proportional to the ground speed of the combine and divides the former by the latter to derive an analog of grain loss per unit area which is independent of time. The preferred embodiment includes a one-shot multivibrator which is triggered to its unstable state to generate a fixed width pulse each time a grain kernel strikes the transducer, a tachometer coupled to the combine wheels and a period timed integrator triggered by tachometer pulses for deriving a unidirectional ground speed voltage inversely proportional to frequency of the tachometer pulses, a pulse frequency modulation chopper circuit turned on and off by the fixed width one-shot pulses and having its peak voltage controlled by the unidirectional ground speed signal for accomplishing division of grain loss rate by combine ground speed, and an averaging circuit for determining the average voltage of the chopper output pulses as an analog of grain loss per unit area.

25 Claims, 14 Drawing Figures

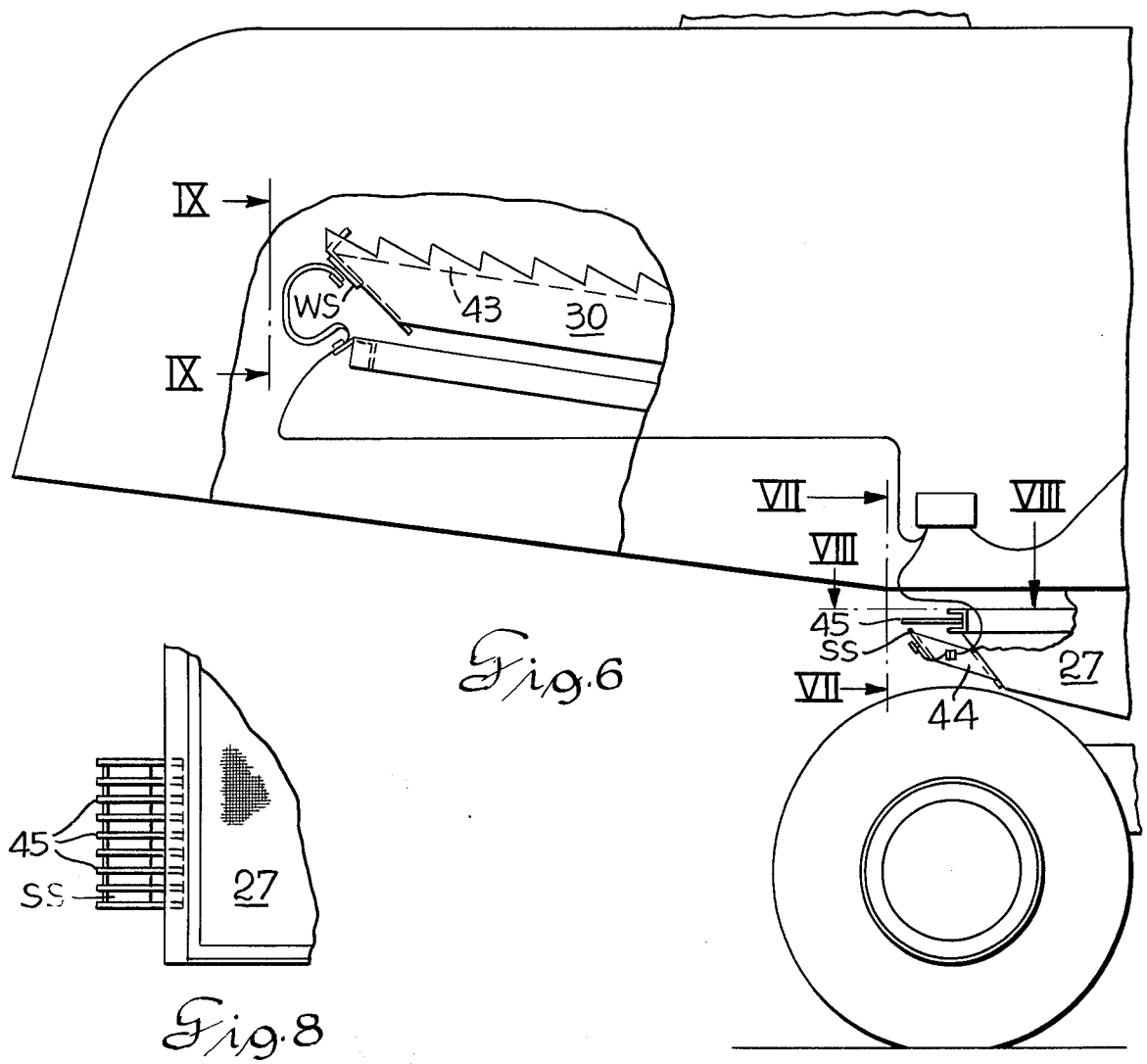
Fig. 6
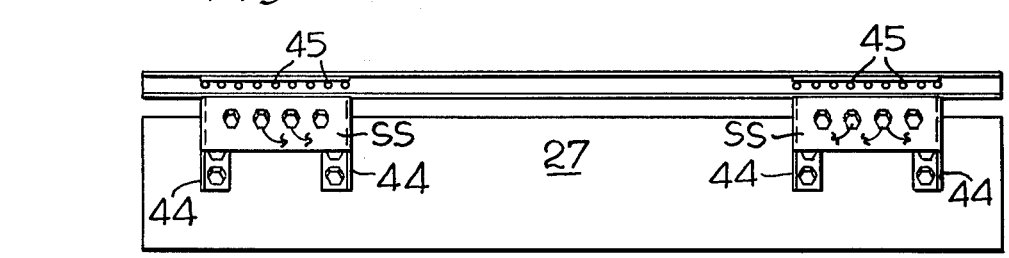
Fig. 8
Fig. 7
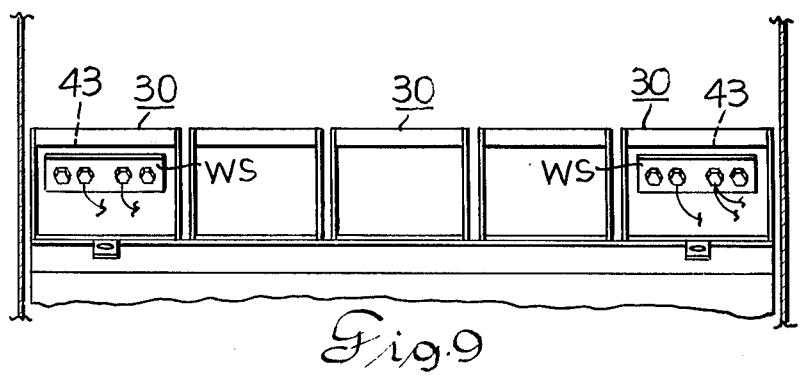
Fig. 9

GRAIN LOSS MONITOR

This invention relates to grain harvesting combines and more particularly to grain loss monitors for indicating to a combine operator the rate at which grain is lost from the combine due to incomplete separation.

BACKGROUND OF THE INVENTION

In a typical combine the grain loss at the shoe and at the walker increases exponentially with feedrate. Variations in crop density during combine operation directly change feedrate, and consequently the grain loss varies. Since feedrate is also a direct function of combine speed, the combine operator can offset such change in loss by altering the operating speed. In an attempt to minimize the human error in monitoring the separation process, grain loss monitors have been developed of the type disclosed in U.S. Pat. No. 3,593,720 to J. R. Botterill and U.S. Pat. No. 3,606,745 to J. C. F. Girodat which detect the number of grain kernels passing per unit time at the discharge end of the walker or of the shoe. However, such known monitors do not indicate whether the combine is being used to maximum processing efficiency since they do not take combine ground speed into account. Grain loss monitors which measure the number of grains passing a sensor per unit time may read 1 at a 1 mile per hour (mph) which is equivalent to a reading of 3 at 3 mph and a reading of 5 at 5 mph. Five times the acreage is covered by the combine in 1 hour at 5 mph as compared to 1 mph, and the grain loss is spread over five times the area, and consequently, the processing efficiency is five times higher at 5 mph than at 1 mph.

It is common practice to judge processing quality by measuring loss per area which actually is the number of kernels per acre after processing. The combine operator cannot sense the loss per area and thus cannot accurately adjust combine speed so as to maintain the same processing quality in the presence of crop variations. The use of loss per acre as a measure of processing quality is an optimal type control in that increased loss presents a cost to the farmer while operation at a lower than acceptable feedrate extends the time required for harvesting and the number of machine operating hours.

OBJECTS OF THE INVENTION

It is an object of the invention to provide an improved grain loss monitor for a harvesting combine which directly indicates processing efficiency to the combine operator.

Another object of the invention is to provide an improved grain loss monitor for a harvesting combine which takes combine ground speed into account and provides a reading of percent grain loss per acre relative to an arbitrary setpoint which is independent of time.

A still further object of the invention is to provide an improved grain loss monitor whose output reading is directly related to cost and is in units in which a farmer customarily thinks.

It is a further object of the invention to provide an improved grain loss monitor for a harvesting combine which indicates grain loss per unit area over a wide range of processing efficiencies with the same sensitivity over the entire range. Another object is to provide such an improved grain loss monitor which is adjustable to indicate grain loss per unit area for crops requiring low threshing cylinder speeds such as corn and soybeans as well as for crops requiring relatively high threshing cylinder speeds such as oats and rice and which provides the same sensitivity of reading regardless of combine cylinder speed.

DESCRIPTION OF THE DRAWINGS

These and other objects and advantages of the invention will be more readily apparent from the following detailed description when considered in conjunction with the accompanying drawing wherein:

FIG. 6 is a side view of a portion of the combine of FIG. 1 carrying the walker sensor and the shoe sensor; and FIGS. 7, 8 and 9 are views taken respectively along lines VII—VII, VIII—VIII and IX—IX of FIG. 6. illustrating the preferred mounting of the shoe sensor and the walker sensor.

SUMMARY OF THE INVENTION

The grain loss monitor of the invention derives: (1) a grain loss rate signal $V_g$ which is a function of the number of grains per unit time that impinge upon an electrical transducer, and (2) a ground speed signal $V_s$ proportional to the ground speed of the combine and divides $V_g$ by $V_s$ to provide an analog of grain loss per unit area which is independent of time. The preferred embodiment accomplishes such division in a pulse frequency modulation (PFM) chopper circuit which multiplies the grain loss rate signal $V_g$ by a unidirectional voltage $k_1/V_s$ inversely proportional to the frequency of pulses from a tachometer driven by the combine wheels.

Grains impinging upon the transducer generate pulses which trigger a one-shot multivibrator to generate output pulses of fixed width ($T_{on}$). A period timed integrator is triggered by each tachometer pulse to initiate a ramp signal, and a peak detector senses the peak voltages of the ramp signals to derive the unidirectional voltage $k_1/V_s$ inversely proportional to combine speed. The chopper circuit is turned on and off by the fixed width one-shot output pulses and its peak voltage is controlled by the unidirectional signal $k_1/V_s$.

Since the variable length grain loss period ($T \sim 1/V_g$) of the chopper is established by the frequency of grains impinging upon the transducer and the chopper is turned on by the one-shot output pulses of fixed width ($T_{on}$) and its peak voltage is regulated by the unidirectional signal $k_1/V_s$ inversely proportional to combine speed, the average voltage of the chopper output pulses is an analog of;

$$\frac{T_{on}}{T} \text{ times } \frac{k_1}{V_s} \text{ equals } \frac{T_{on}}{\left[\frac{1}{V_g}\right]} \text{ times } \frac{k_1}{V_s} \text{ equals} (T_{on} \cdot k_1) \left[\frac{V_g}{V_s}\right]$$

Such ratio of grain frequency to ground speed is typically in units of bushels per foot, and considering the constant width of the combine header, it is also an analog of grain loss per unit area in such typical units as bushels per acre. The average voltage of the chopper output pulses is determined in an averaging circuit as an indication of processing efficiency and is displayed with respect to a reference level on a meter in view of the combine operator who may then maintain combine speed at a value which will recover the preset percentage of grain for the particular crop conditions.

DETAILED DESCRIPTION

Figure 1:
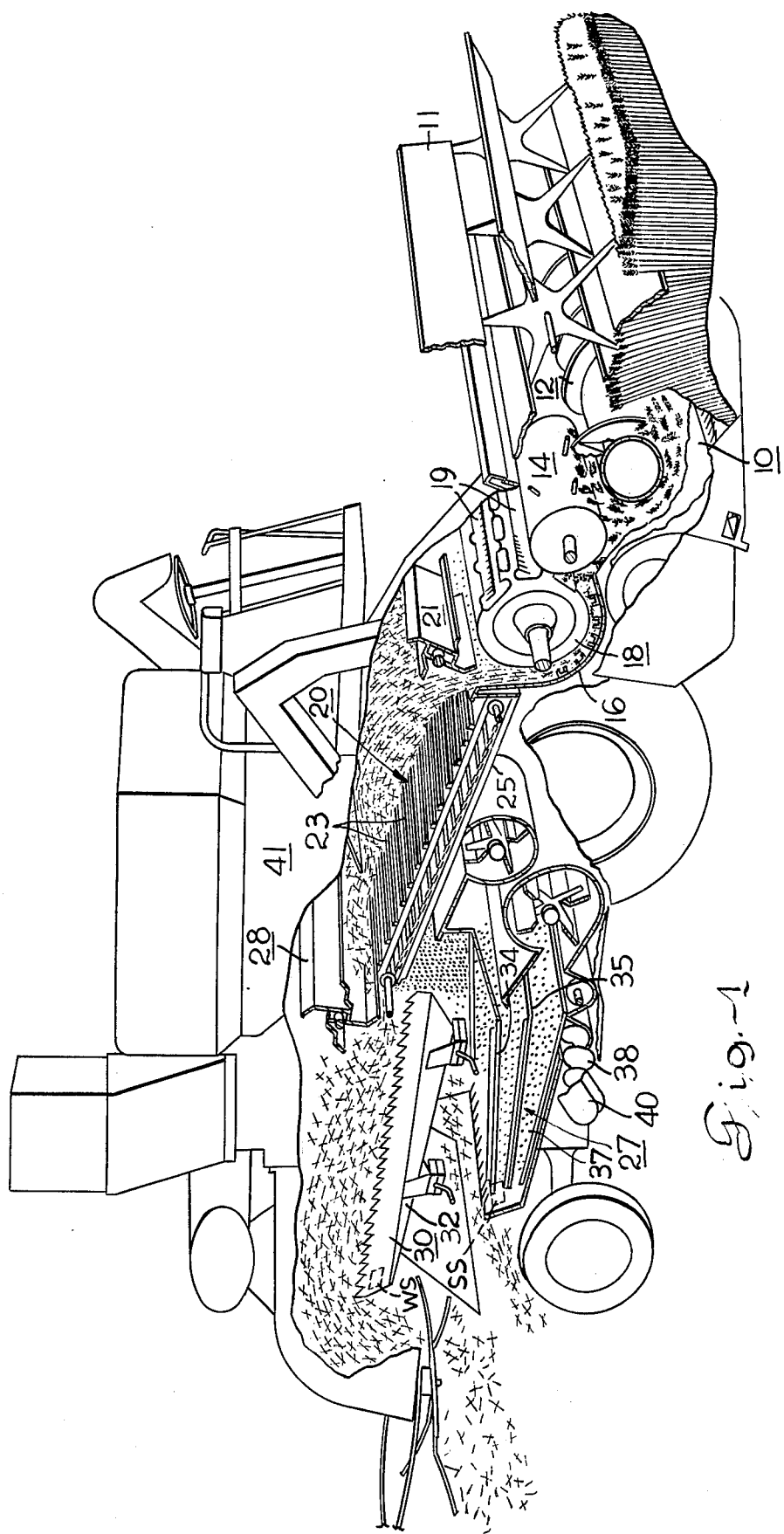
FIG. 1 is a perspective view of a known harvesting combine on which the grain loss monitor of the invention is mounted.

Referring to FIG. 1 of the drawing, a known combinethresher may have a cutting bar 10 which cuts the standing crop and a reel 11 which feeds the cut crop to a header (not shown) where a rotating auger 12 moves the material to the center of the header and feeds it to a rotating feeder beater 14. The material delivered from beater 14 may pass between a concave 16 and a rotating thresher cylinder 18 having thresher bars 19 which beat the crop material. The majority of the grains and part of the chaff fall through the open concave 16 onto a lower raddle (not shown), and the grain may then be conveyed to an upper raddle, or front separator 20. A rotating wingtype thresher beater 21 agitates the material after it leaves the cylinder 18 and directs it to the upper raddle 20 while keeping most of the straw in suspension and allowing the grains to fall between the raddle slats 23 as the material is carried over a false bottom 25 to a high point in the front separator. The clean grain falls through the suspended straw and is delivered on to a shaker-type cleaning shoe 27.

A second rotating wing-type beater 28 may agitate the straw as it leaves the upper raddle 20 and delivers it on to the oscillating straw walkers 30 which move the straw and chaff and remaining threshed grain in a series of steps toward the discharge end of the combine. Loose grain released from the straw-chaff grain mixture sifts down and falls through openings in the straw walkers 30 onto a downwardly inclined chute 32 which delivers the grain to the forward end of shoe 27. Cleaning shoe 27 may include a vibratory return pan 34, a vibrating chaffer sieve 35 suspended at one end of return pan 34, and a vibratory cleaning sieve 37 suspended under chaffer sieve 35. The grain and chaff falling off return pan 34 drop onto chaffer sieve 35, and the grain falls through sieves 35 and 37 and is collected by an auger 38 and transported by a clean grain conveyor 40 to a bin 41.

A walker impact sensor electrical transducer WS such as a piezoelectric element may be mounted beneath the perforated screen 43 (see FIGS. 6 and 9) adjacent the discharge end of each end straw walker 30 wherein it is in the path of grain falling through the screen 43 to the ground. A similar shoe electrical transducer SS may be mounted on a support bracket 44 (see FIGS. 6, 7 and 8) and below the chaffer and cleaning sieves 35 and 37 in the path of grain kernels which may fall therefrom onto the ground. A plurality of laterally spaced horizontally extending fingers 45 may be affixed to cleaning shoe 27 above shoe sensor SS which convey the chaff rearwardly beyond the shoe sensor while permitting grain kernels to fall between the fingers 45 and impact on the sensor SS.

BLOCK DIAGRAM DESCRIPTION

Figure 2:
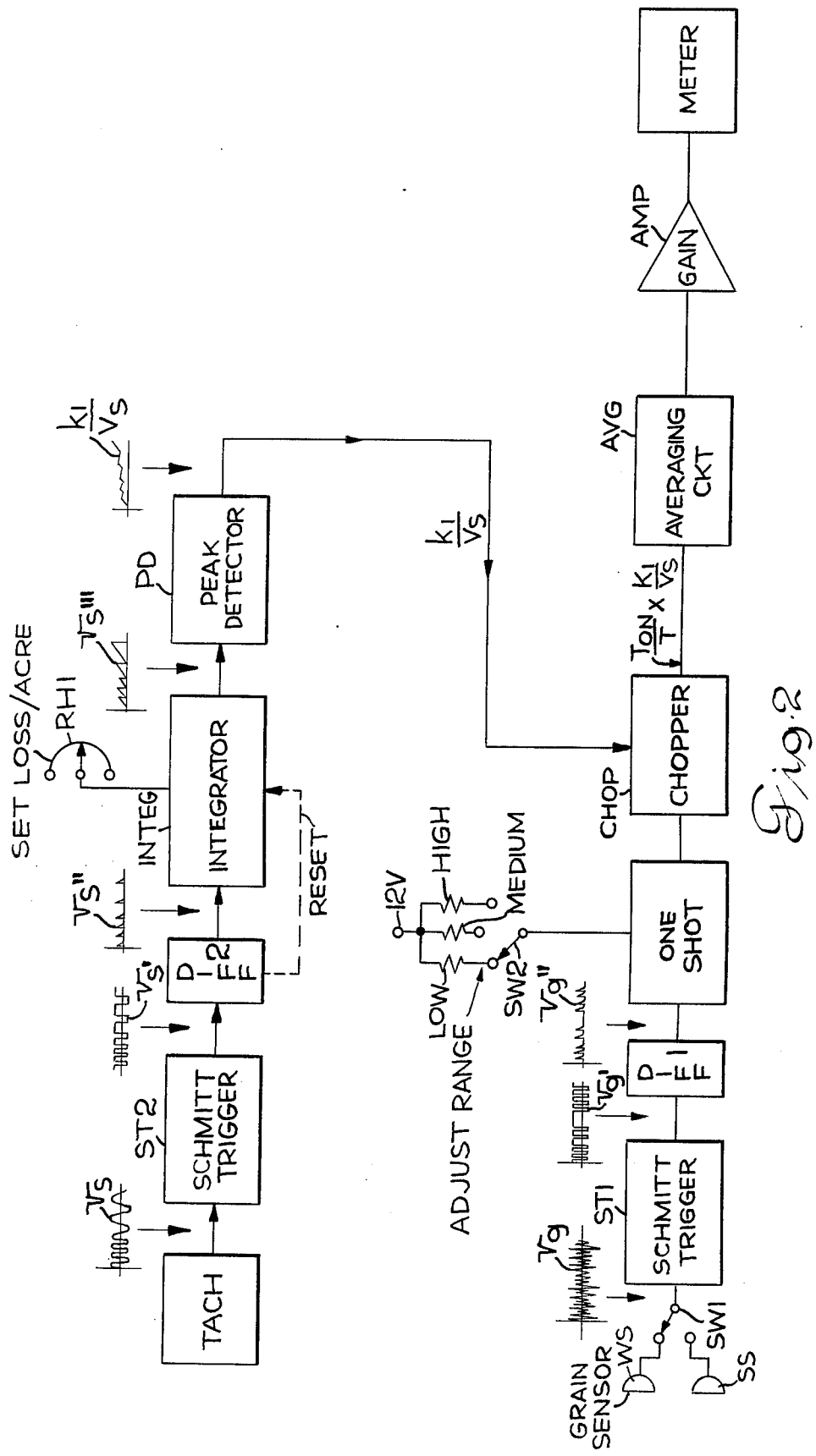
FIG. 2 is a schematic block diagram of the grain loss monitor of the invention.
Figure 3A:
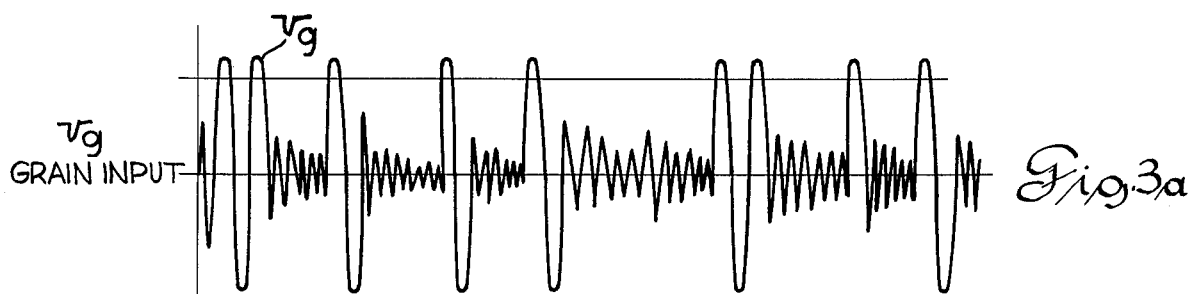
FIGS. 3a and 3b illustrate voltage pulses at different points in the grain rate signal portion of the monitor resulting from grain and chaff striking the sensor.
Figure 3B:
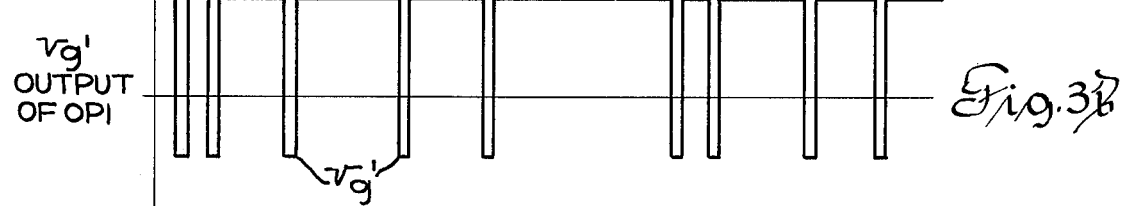

Referring to FIG. 2, a manual switch SW1 permits the combine operator to select the walker sensor WS or the shoe sensor SS, or both. Assume that the operator selects the walker sensor WS which generates a pulse $v_g$ (also shown in FIG. 3a) each time it is struck by a grain kernel. A Schmitt trigger circuit ST1 receives the variable frequency pulses from transducer WS and discriminates between those resulting from chaff and grain by switching to the opposite state to generate a square wave pulse $v_g'$ shown in FIG. 3b only when the pulse $v_g$ is of sufficient magnitude to be caused by a grain kernel. Each grain loss rate pulse $v_g'$ is applied to a differentiator DIFF 1 to derive a spike pulse $v_g''$ that "sets" a monostable multivibrator MONO which switches to its unstable state for a predetermined period $(I_{on})$.

The fixed width pulse from one-shot MONO is an input to chopper circuit CHOP. A manual switch SW2 permits selection of the range of processing efficiency (grain loss rate/acre) by changing the period $T_{on}$ of one-shot MONO to thereby vary the "on-time" of chopper circuit CHOP given a constant loss rate $V_g$.

Figure 4A:
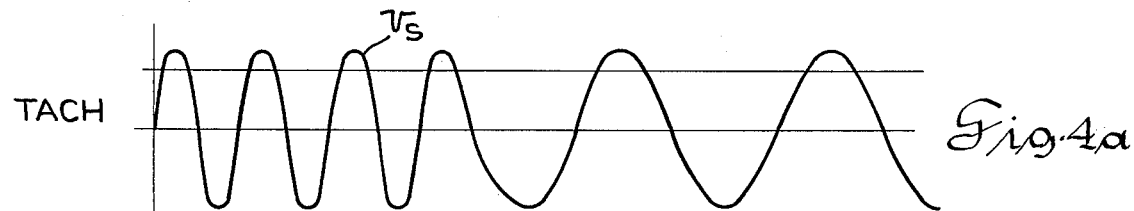
FIGS. 4a, 4b, 4c, 4d and 4e respectively illustrate signals at different points in the ground speed signal portion of the monitor which receives signals from a tachometer driven by the combine.
Figure 4B:
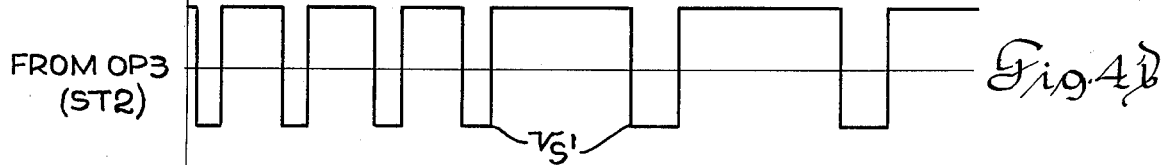

A tachometer TACH preferably of the reluctance proximity type driven by the wheels of the combine generates tachometer signals $v_s$ shown in FIG. 4a whose frequency is directly proportional to combine ground speed. The tachometer signal $v_s$ is converted to a square wave pulse $v_s'$ shown in FIG. 4b by a Schmitt trigger circuit ST2. The positive-going edge of each pulse $v_s'$ is converted by a differentiator DIFF 2 into a spike pulse $v_s''$ shown in FIG. 4. Each spike pulse $v_s''$ resets a period timed integrator INTEG to zero and triggers it to initiate a ramp voltage $v_s'''$ shown in FIG. 4d which increases from zero linearly until the integrator is again reset by a succeeding spike pulse $v_s''$.

The loss/acre signal $(V_g/V_s)$ will vary widely with the variety of crop, being lower in corn or soybeans than in small grains or grain sorghum. Stated another way, a far larger number of kernels of wheat will impact upon the sensor per foot of combine travel than if the crop is corn. Setting of a low, medium or high range of loss per acre is accomplished by adjusting manual switch SW2 to thereby regulate the period of one-shot multivibrator MONO. Selection of a setpoint within the range established by switch SW2 is accomplished by adjusting rheostat RH1 to thereby vary the rate $k_1$ at which the ramp speed signals $v_s'''$ increase with time (i.e., by varying the slope of the ramp signals $v_s'''$). The relative amplification of signal $V_g/V_s$ is thus accomplished by adjustment of the "on time" $T_{on}$ and slope $k_1$ to account for different crops and variations in harvesting conditions.

Figure 4C:
Figure 4D:
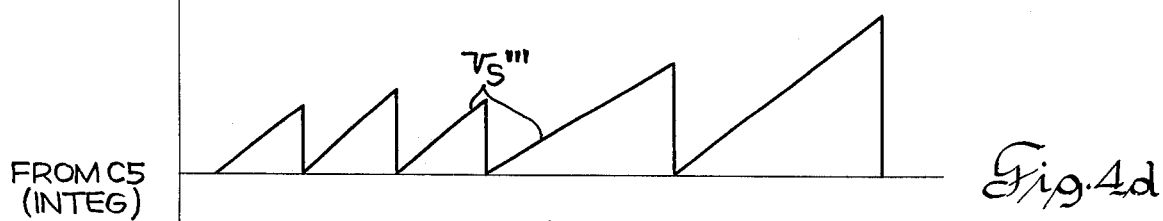
Figure 4E:
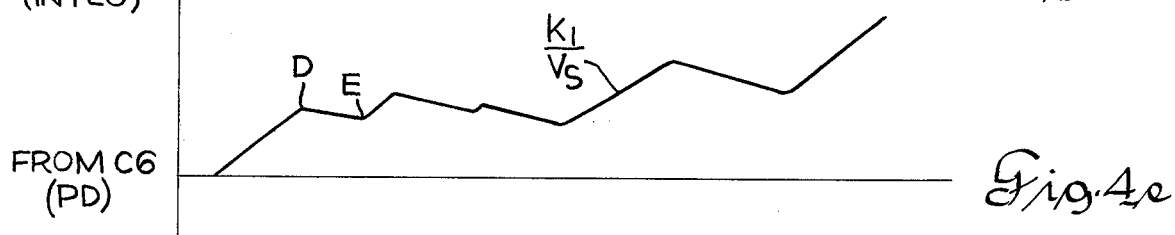

The ramp signals $v_s'''$ from integrator INTEG are coupled to a peak detector PD which derives a unidirectional signal $k_1/V_s$ shown in FIG. 4e inversely proportional to the frequency of the tachometer pulses $v_s$, and thus inversely proportional to combine ground speed.

The preferred embodiment utilizes the PFM multiplier or chopper CHOP to accomplish division of the grain loss rate signal $V_g$ by the ground speed signal $V_s$. Neither the signal $V_g$ per se or the signal $V_s$ per se are derived. Circuit CHOP derives an analog of the product of $(V_g \cdot T_{on})$ and $(k_1/V_s)$ to effect division of grain loss rate by combine speed. In chopper CHOP the fixed width, variable frequency one-shot pulses (whose frequency is established by grain kernels striking sensor WS), in effect, chop the variable voltage ($k_1/V_s$) which is inversely proportional to combine ground speed. Since the chopper CHOP is turned on and off by the one-shot output pulses, the period T of the chopper is equal to the variable length grain loss period between grain kernels striking sensor WS. The on-time $T_{on}$ of the chopper CHOP is established by the constant width of the one-shot output pulses. The peak voltage of the chopper is controlled by the signal ($k_1/V_s$) which is inversely proportional to combine ground speed. Since the grain loss signal $V_g$ is directly proportional to the frequency of grains and inversely proportional to the variable length grain loss period T, or ($V_g \sim 1/T$) the average voltage of the output pulses from chopper CHOP is an analog of ($k_1 \cdot T_{on}$) ($V_g/V_s$), i.e., a direct analog of grain loss rate and an inverse function of combine ground speed and is independent of time.

The output pulses from chopper circuit CHOP are applied to an averaging circuit AVG which derives a unidirectional signal proportional to the average voltage of the chopper output pulses.

The average voltage of the chopper output pulses is displayed on an analog meter. The loss/acre setpoint is defined for each setting of the range switch SW2 and setpoint rheostat RH1 by the ratio $V_g/V_s$ which will produce mid-scale meter deflection. Similarly the null or mid-scale meter deflection corresponds to a particular average voltage output from the chopper CHOP. Therefore, in order to select a particular ratio $V_g/V_s$ as the loss/acre setpoint, the scaling constant ($k_1 \cdot T_{on}$) must be adjusted such that $$k_1 \cdot T_{on} \left(\frac{V_g}{V_s}\right) = \text{constant}$$

Once the range switch and setpoint rheostat positions have been established, the meter indicates the percent change in $V_g/V_s$ ratio by scale markings on the meter over a range of ±100 percent of the loss/acre setpoint.

When the ground speed is such that the processing efficiency (loss/acre) of the combine for the particular crop being harvested is equal to that selected by the combine operator on switch SW2 as adjusted by rheostat RH1, the meter will indicate a "null" condition and the average voltage of the chopper output pulses will equal the voltage required to drive the meter to midscale "null" position. If the crop conditions change so that grain loss/acre varies up or down, the percent variation is indicated by the meter and thus informs the operator to alter his speed so as to return the loss/acre to the desired value.

CIRCUIT DIAGRAM DESCRIPTION

Grain Signal Section

Figure 5:
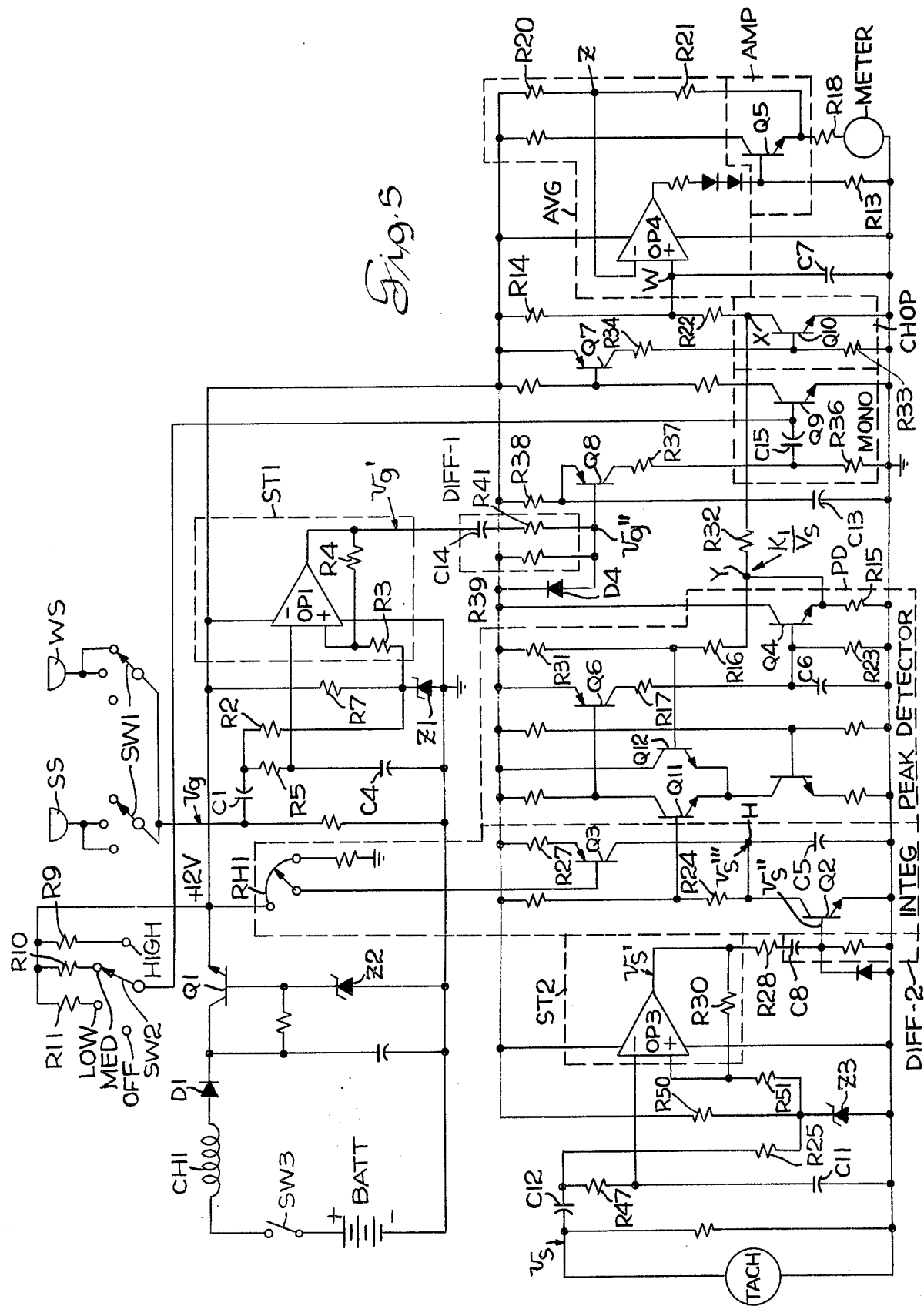
FIG. 5 is a circuit diagram of the grain loss monitor of the invention.

Switch SW1 permits the combine operator to alternatively connect the shoe sensor SS or the walker sensor WS, or both, to Schmitt trigger ST1 including an operational amplifier OP1 shown in FIG. 5. The signal shown in FIG. 3a generated when the sensor WS or SS is struck by the grain kernels, chaff and straw is variable in frequency and magnitude. The sensor output signal $v_g$ resulting from a grain kernel impacting on the sensor is higher in amplitude and frequency than that from the chaff, and frequency discrimination between transducer output pulses resulting from grain and from chaff is accomplished by applying the sensor output signal to the inverting input of amplifier OP1 through a band pass filter having a low frequency cutoff section comprising a capacitor C1 and a resistor R2 and a high frequency cutoff section comprising a capacitor C4 and a resistance R5. The triggering level of amplifier OP1 is established by positive feedback through the resistor-divider combination R4, R3. The output voltage swing of amplifier OP1 is divided by the R4, R3 combination with the resulting divided voltage applied as a reference voltage to the noninverting input. This change in voltage must be exceeded by the signal $v_g$ applied to the inverting input for amplifier OP1 to switch states.

The constant voltage power supply includes a unidirectional voltage source BATT having its negative terminal grounded and its positive terminal connected to terminal +12V through a manual switch SW3, a choke CH1, a diode D1, and a series voltage regulating transistor Q1 having a voltage reference Zener diode Z2 connected between its base and ground. Choke CH1 suppresses radio frequency transients.

Assume switch SW1 is set to utilize the walker sensor WS only, as shown in FIG. 5. If the magnitude of the sensor output signal coupled to the inverting input of amplifier OP1 when sensor WS is struck by a grain kernel is higher than the reference voltage on its noninverting input, the output of amplifier OP1 will be switched negative to generate a square pulse $v_g'$. The negative-going pulse $v_g'$ from amplifier OP1 is coupled through differentiating circuit DIFF 1 comprising a capacitor C14 in series with a resistor R41 to generate a spike pulse $v_g''$ which is applied to the base of a transistor Q8 and turns it on to "set" a one-shot, or monostable multivibrator MONO. Amplifier OP1 thus amplitude discriminates between transducer output signals caused by grain and by chaff striking sensor WS and switches its output negative only when the sensor output signal is of sufficient magnitude to be caused by a grain kernel.

A capacitor C13 connected in series with a resistance R38 between ground and the +12V supply is normally charged to a positive potential. Conduction by transistor Q8, when it is turned on by spike pulse $v_g''$, transfers charge from C13 through collector resistance R37 to charge a capacitor C15 to a positive potential.

The output of one-shot MONO is derived at the collector of NPN transistor Q9 which is normally forward biased into conduction from the +12V source through one of the resistors R9, R10 or R11 selected by range setting switch SW2. The emitter of Q9 is grounded so its collector is normally at a low voltage. When spike pulse $v_g''$ disappears and Q8 turns off, the resulting change of voltage on capacitor C15 results in a potential negative with respect to ground being applied to the base of Q9 so that it turns off to generate the leading positive-going edge of the one-shot output pulse at its collector. Capacitor C15 then discharges through R9, R10 or R11 at a rate corresponding to the low, medium or high setting of range selector switch SW2. Transistor Q9 remains off until capacitor C15 discharges to approximately 0.6 volt in the reverse direction at which voltage transistor Q9 returns to the on state. The period of one-shot MONO is determined by the rate at which C15 discharges which is established by the setting of range switch SW2. The monostable output pulse generated at the collector of Q9 is amplified by transistors Q7 and Q10 to accomplish the chopping of the peak detector output unidirectional voltage ($k_1/V_s$) applied at point X to the collector of chopper transistor Q10. The emitter of normally conducting chopper transistor Q10 is grounded so that its collector is clamped to ground during the off-time of chopper CHOP, and Q10 is turned off to initiate the on-time $T_{on}$ of the variable frequency chopper pulses derived at its collector.

Combine Speed Section

The frequency of the output signal $v_s$ (shown in FIG. 4a) from tachometer TACH is proportional to combine ground speed and is applied to the inverting input of an operational amplifier OP3 of Schmitt trigger circuit ST2 through a low frequency cutoff filter section C12–R25 and also through a high frequency cutoff filter section R47–C11. The tachometer output voltage increases with combine speed, and high frequency cutoff filter section R47–C11 attenuates linearly with increase in input frequency so that amplifier OP3 receives a variable frequency input $v_s$ of approximately constant voltage on its inverting input. The triggering level for amplifier OP3 is established by positive feedback through a resistor-divider combination R30–R51. The output voltage swing of amplifier OP3 is divided by the R30–R51 combination and applied as a reference voltage to the noninverting input. When the magnitude of tachometer signal $v_s$ applied to the inverting input becomes more positive than the predetermined switching level, the output of amplifier OP3 switches to generate a square wave $v_s'$ shown in FIG. 4b.

The positive-going edge of each pulse $v_s'$ from amplifier OP3 is converted by differentiator DIFF 2 including capacitor C8 and resistance R28 into a positive-going spike pulse $v_s''$ shown in FIG. 4c. Each spike pulse $v_s''$ turns on an NPN transistor Q2 of a period timed integrator circuit INTEG, and conduction by transistor Q2 short circuits a capacitor C5 to reset integrator circuit INTEG to zero. When transistor Q2 turns off at the end of the spike pulse $v_s''$, capacitor C5 begins to charge from zero to generate a ramp voltage $v_s'''$ shown in FIG. 4d which increases linearly with time until the integrator INTEG is again reset by a succeeding spike pulse $v_s''$. Capacitor C5 is charged from a constant current source which includes a PNP transistor Q3 whose base voltage is regulated by loss per acre setting rheostat RH1. Adjustment of rheostat RH1 varies the magnitude of charging current to capacitor C5 and thus changes the slope $k_1$, of ramp signals $v_s'''$.

The ramp signals $v_s'''$ derived across C5 are coupled through an input resistance R24 to peak detector PD which includes a unidirectional differential amplifier having a pair of transistors Q11, Q12 differentially connected and the ramp signals coupled to the base of Q11. The peak detector output signal $k_1/V_s$ is derived at point Y which is coupled through feedback resistor R16 to the base of Q12 and also coupled through a resistance R32 to the collector of chopper transistor Q10. The differential amplifier Q11, Q12 controls the voltage across a capacitor C6 which is coupled to point Y through an emitter follower transistor Q4 with the voltage developed across emitter resistance R15 applied to point Y. The peak detector acts to hold the peak voltage of $V_s'''$, which appears at point H, during the time interval until the next peak occurs. The differential amplifier only "tracks" when the voltage at point H is more positive than that of point Y, thereby turning on Q11 which conducts to turn on transistor Q6. Charging current then flows through the emittercollector circuit of Q6 to charge C6. When the voltage at point Y is greater than that at point H, Q12 turns on and Q11 and Q6 turn off, and C6 discharges through resistance R23 to ground so that the voltage $k_1/V_s$ at point Y decays as shown by the portion DE in FIG. 4e.

Chopper transistor Q10 is normally conducting so its collector is clamped to ground, which establishes the off voltage of the chopper. The chopper period is equal to the variable grain loss period T, the chopper on-time is established by the fixed width $T_{on}$ of the pulses from one-shot MONO, and the peak voltage of the chopper output pulses is equal to the signal $k_1/V_s$ from peak detector PD applied to the collector of Q10. Consequently the average voltage of the chopper output pulses is an analog of $T_{on}/T$ times $k_1/V_s$.

The chopper output pulses derived at point X are translated up in voltage by collector resistors R22 and R14 and filtered by a capacitor C7. The potential across averaging capacitor C7 is applied to the noninverting input of an operational amplifier OP4 whose output is coupled to the base of a current gain amplifier AMP preferably comprising an emitter follower transistor Q5. Operational amplifier OP4 may be considered to be a high impedance coupling device which permits the average voltage of the chopper output pulses appearing at point X to be averaged with a high impedance filter and then reproduced at the emitter of Q5 with a low source impedance. The average voltage of the chopper output pulses appearing at the emitter of Q5 is applied across a METER in series with a resistance R18 and produces a deflection of the meter pointer proportional to the average voltage out of the chopper.

The potential at the emitter of Q5 is also translated up in voltage by resistors R20 and R21, and operational amplifier OP4 compares the voltage at point W at the junction of R14, R22 with the voltage at point Z at the junction of R20, R21 and controls the base current into Q5 so that these voltages are equal. Both resistance voltage dividers R14, R22 and R20, R21 are referenced to the supply voltage and thus have equal voltage across the whole divider to assure that the divided voltages at joints W and Z are equal. Consequently the average voltage of the chopper output appears at the emitter of transistor Q5 and is displayed on the METER.

The METER preferably has a mid-scale indicia that represents a null point and markings on either side of mid-scale to indicate deviations from null. The combine operator initially sets the null point by operating the combine at a speed which will produce the desired loss per acre and then adjusting range switch SW2 and rheostat RH1 to yield a null reading on the METER. Subsequent operation of the combine will result in the meter pointer indicating the percent deviation of loss per acre from the null setpoint (as defined by the settings of SW2 and RH1). Reduction in loss per acre as indicated by deflection of the METER pointer below the mid-scale nullpoint will inform the operator that combine speed can be increased to again bring the loss per acre to the setpoint value. Conversely, an increase in loss per acre indicated by the pointer of the METER reading above the nullpoint informs the operator that combine speed can be reduced to again bring loss per acre to the setpoint value.

Switch SW2 and rheostat RH1 permit setting of grain loss rate per acre over a relatively wide range (in the order of 100 to 1) to permit monitoring of processing efficiency for crops like rice and oats having a relatively large number of grains per acre impact upon sensor WS as well as for crops similar to soybeans and corn wherein a relatively small number of grains per acre strike the sensor. The monitor of the invention provides approximately the same accuracy of reading over the wide range of processing efficiencies by utilizing the constant null point setting in each crop condition.

While only a single embodiment of the invention has been illustrated and described, it should be understood that we do not intend to be limited to the single embodiment for many modifications and variations thereof will be obvious to those skilled in the art.

The embodiments of the invention in which an exclusive property or privilege is claimed are defined as follows:

1. A grain loss per unit area monitor for a variable speed combine adapted to harvest a crop and recover grain therefrom comprising, in combination,
    means including an electrical transducer adapted to be positioned in the flow path of grain in said combine for generating a grain flow rate signal which is a function of the number of grains of said crop impinging on said transducer,
    means for deriving a ground speed signal which is a function of the ground speed of said combine, and
    means for deriving a signal which is the analog of said grain flow rate signal divided by said ground speed signal, whereby said analog signal is indicative of grain loss per unit area and is independent of time.

2. A grain loss per unit area monitor in accordance with claim 1 wherein said grain flow rate signal comprises a succession of pulses whose frequency is a function of the number of said grains impinging on said transducer and said analog signal deriving means includes a pulse frequency modulation circuit which is modulated by said grain flow rate signal pulses.

3. A grain loss per unit area monitor in accordance with claim 2 wherein said ground speed signal deriving means generates a unidirectional signal which is inversely proportional to the ground speed of said combine and said frequency modulation circuit includes multiplier means for multiplying said unidirectional signal and said grain flow rate signal to derive said analog of said grain flow rate signal divided by said ground speed signal.

4. A grain loss per unit area monitor in accordance with claim 3 and including means for selectively varying the proportionality factor ($k_1$) between combine ground speed and the magnitude of said unidirectional signal to thereby permit adjustment of desired grain loss per unit area.

5. A grain loss per unit area monitor in accordance with claim 4 and including means for selectively varying the width of said grain flow rate signal pulses to thereby permit adjustment of the range of grain loss per unit area to be monitored.

6. A grain loss per unit area monitor in accordance with claim 5 and including
    averaging circuit means for deriving the average voltage of the output from said multiplier means, and
    means for comparing said average voltage to a reference potential and for providing a visual indication of their difference as a representation of deviation of loss per unit area from the desired magnitude established by said range adjusting means and grain loss per unit area adjusting means.

7. A grain loss per unit area monitor in accordance with claim 6 wherein said means for providing a visual indication includes voltmeter means having a visual indicia to which its pointer is actuated when said reference potential is applied thereto, and means for coupling said average voltage to said voltmeter means.

8. A grain loss per unit area monitor in accordance with claim 3 wherein said means for generating a grain flow rate signal includes one-shot multivibrator means triggered to derive fixed width output pulses in response to grains of said crop impacting upon said transducer, and said multiplier means includes a chopper whose on-time is controlled by said fixed width output pulses from said one-shot multivibrator means, said unidirectional ground speed signal controlling the peak voltage of output pulses from said chopper.

9. A grain loss per unit area monitor in accordance with claim 8 and including averaging circuit means for deriving a unidirectional potential equal to the average voltage of the output pulses from said chopper as an indication of the grain loss per unit area harvested by said combine.

10. A grain loss per unit area monitor in accordance with claim 3 wherein said multiplier means includes a chopper which is turned on and off by said grain loss rate signal pulses, and wherein said unidirectional ground speed signal regulates the peak voltage of the output pulses from said chopper.

11. A grain loss per unit area monitor in accordance with claim 10 wherein said electrical transducer generates pulses when said grains of said crop impinge thereon and said means for generating a grain flow rate signal includes one-shot multivibrator means triggered by each transducer output pulse above a predetermined magnitude to apply a fixed width pulse to said chopper to turn said chopper on.

12. A grain loss per unit area monitor in accordance with claim 11 and including grain loss per unit area setting means for selectively varying the width of said multivibrator output pulses.

13. A grain loss per unit area monitor in accordance with claim 1 wherein said grain flow rate signal generating means is an electric circuit and including
    means for selectively varying the gain of said electric circuit to thereby permit adjustment of the range of desired grain loss per unit area,
    averaging means for determining the average voltage of said analog signal, and
    means for comparing said average voltage to a fixed setpoint reference potential and for providing a visual indication of their difference as a representation of deviation of grain loss per unit area from a desired value, whereby said monitor provides the same accuracy of indication over a range of grain loss per unit area settings.

14. A grain loss per unit area monitor in accordance with claim 13 wherein said means for deriving a ground speed signal is an electric circuit which generates a signal which is inversely proportional to the ground speed of said combine, and
    means for selectively varying the gain of said ground speed signal deriving electrical circuit.

15. A grain loss per unit area monitor for a combine comprising, in combination,
    means including an electrical transducer adapted to be positioned in the flow path of grain in said combine for generating a grain flow rate signal which is a function of the number of grains impacting on said transducer, means including a tachometer for deriving a unidirectional ground speed signal whose magnitude is inversely proportional to the ground speed of said combine, multiplier means for deriving the product of said grain flow rate signal and said unidirectional ground speed signal, and means for indicating the magnitude of the output from said multiplier means as a representation of the grain loss per unit area harvested by said combine.

16. A grain loss per unit area monitor in accordance with claim 15 wherein said grain flow rate signal comprises a train of pulses whose frequency is a function of the number of said grains impacting on said transducer and said multiplier means includes a pulse frequency modulation circuit which is modulated by said grain flow rate signal pulses.

17. A grain loss per unit area monitor in accordance with claim 15 wherein said means for generating a grain flow rate signal includes monostable multivibrator means for deriving fixed width output pulses in response to grains impinging upon said electrical transducer, and said multiplier means includes a chopper which is turned on by said fixed width output pulses from said multivibrator, said unidirectional ground speed signal regulating the peak voltage of the output pulse from said chopper.

18. A grain loss monitor in accordance with claim 17 and including grain loss per unit area setting means for selectively adjusting the proportionality factor between the frequency of the output pulses from said tachometer and the magnitude of said unidirectional ground speed signal.

19. A grain loss per unit area monitor in accordance with claim 18 and including range of grain loss per unit area setting means for selectively varying the period of said monostable multivibrator means to thereby permit adjustment of the width of said grain flow rate signal pulses.

20. A grain loss monitor in accordance with claim 19 wherein said means for indicating the magnitude of the output from said multiplier means includes means for determining the average voltage of said chopper output pulses, and means for providing a visual indication of the difference between said average voltage and a reference potential as a measure of the deviation of the actual loss per unit area from the desired magnitude set on said range setting means as adjusted by said loss per unit area setting means.

21. A grain loss monitor in accordance with claim 20 wherein said means for providing a visual indication includes voltmeter means having a visual indicia to which its pointer is actuated when said reference potential is applied thereto, and means for coupling said average voltage to said voltmeter means.

22. A grain loss monitor for a variable speed combine adapted to harvest a crop and recover grain therefrom comprising, in combination, electrical transducer means adapted to be positioned in the flow path of grain in said combine for generating grain flow rate pulses when grains of said crop impinge thereon, a monostable multivibrator triggered by said grain flow rate pulses to generate fixed width output pulses, tachometer means coupled to said combine for deriving tachometer pulses at a frequency which is a function of the ground speed of said combine, integrator means for deriving a unidirectional ground speed signal whose magnitude is inversely proportional to the frequency of said tachometer pulses, multiplier chopper means turned on by said fixed width output pulses from said multivibrator for chopping said unidirectional ground speed signal, and means for indicating the average voltage of the output pulses from said chopper means as an analog of grain loss per unit area harvested by said combine.

23. A grain loss per unit area monitor in accordance with claim 22 wherein said integrator means includes an RC capacitor charging circuit wherein a ramp voltage built up across a capacitor in the interim between said grain flow rate pulses establishes the magnitude of said unidirectional ground speed signal, and including grain loss per unit area setting means for selectively varying the magnitude of charging current flowing into and capacitor to thereby adjust the proportionality factor between the frequency of said tachometer pulses and the magnitude of said ground speed signal.

24. A grain loss monitor in accordance with claim 23 wherein said monostable multivibrator includes an RC capacitor charging circuit whose time constant establishes the period of said multivibrator, and including range of grain loss per unit area setting means for selectively varying the magnitude of resistance in said RC capacitor charging circuit of said multivibrator to thereby permit adjustment of the duration of said fixed width pulses.

25. A grain loss monitor in accordance with claim 22 wherein said indicating means includes averaging circuit means for deriving a unidirectional potential whose magnitude is a fuction of the average voltage of said chopper output pulses, and means for comparing said unidirectional potential to a reference voltage and for providing a visual indication of their difference as a representation of deviation of the loss per unit area from the desired value established on said range setting means and said loss per unit area setting means.

* * * * *